Oct. 7, 1952

R. DORAND 2,612,963

SPRING-BIASED AUTOGYRO ROTOR BLADE

Filed May 1, 1948

Inventor
René Dorand

Oct. 7, 1952 — R. DORAND — 2,612,963
SPRING-BIASED AUTOGYRO ROTOR BLADE
Filed May 1, 1948 — 4 Sheets-Sheet 2

Oct. 7, 1952   R. DORAND   2,612,963
SPRING-BIASED AUTOGYRO ROTOR BLADE
Filed May 1, 1948   4 Sheets-Sheet 3
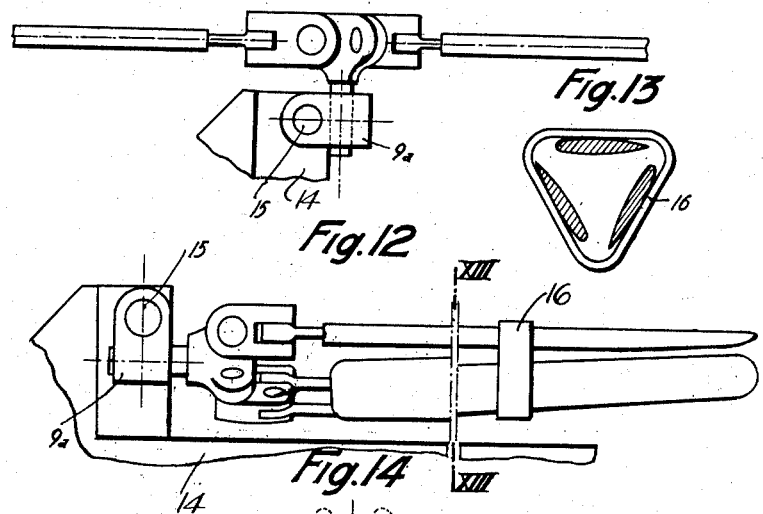
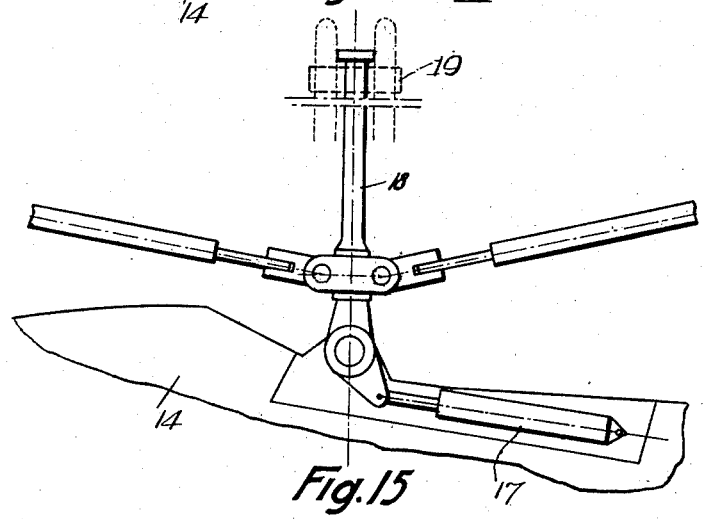
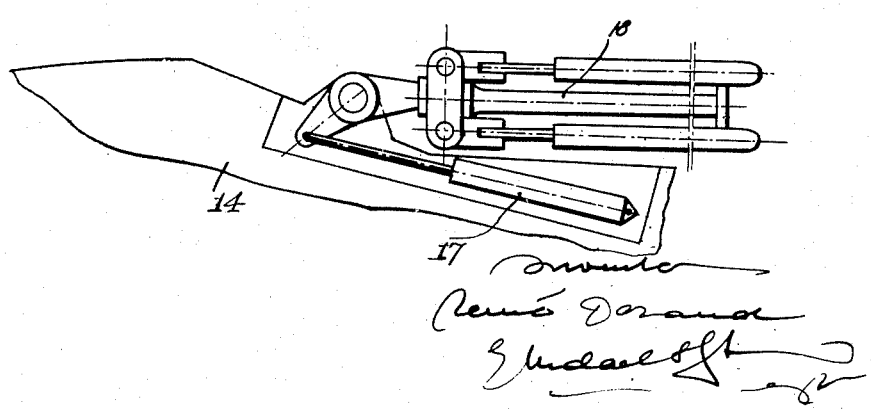

Oct. 7, 1952           R. DORAND           2,612,963
SPRING-BIASED AUTOGYRO ROTOR BLADE
Filed May 1, 1948           4 Sheets-Sheet 4
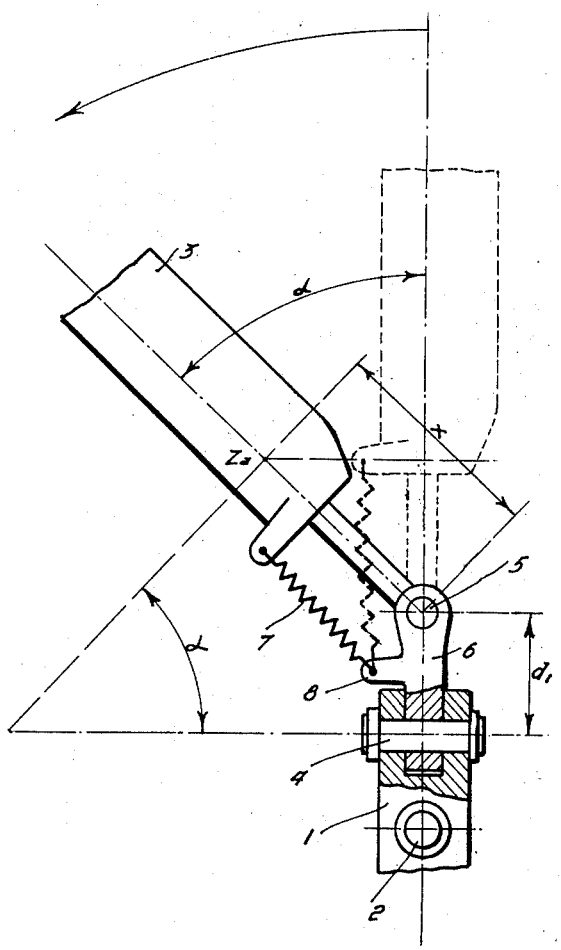
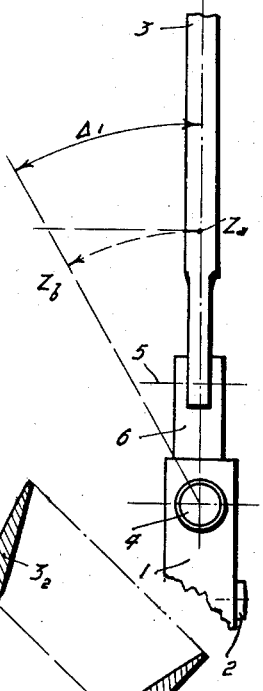
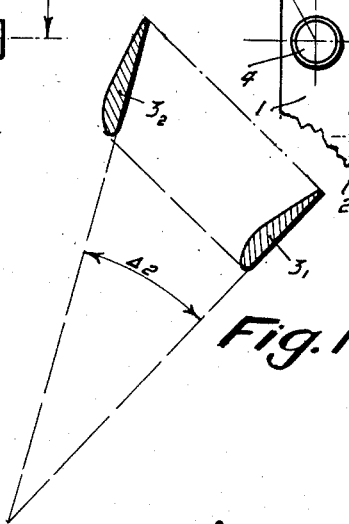
Inventor:
Rene Dorand
By: Michael S. Striker Patented Oct. 7, 1952

2,612,963

UNITED STATES PATENT OFFICE 2,612,963

SPRING-BIASED AUTOGYRO ROTOR BLADE

René Dorand, Versailles, France

Application May 1, 1948, Serial No. 24,654
In France May 27, 1947

7 Claims. (Cl. 170—160.52)

The present invention relates to a wing arrangement for autogyro rotors, and it has for its object to provide improvements in such wing arrangements.

The use of parachutes and gliders at present reqires the use of large surfaces as soon as the load becomes appreciable so that parachutes are not very easy to handle and gliders are very cumbersome.

Airborne autogyro rotors may constitute a suitable means for dropping any objects in flight, and even a safety means for aircraft with engines. The wings of such rotors, which may be made to fold into a small space when they are not in use, offer good maneuvering possibilities. Their drawback is that, left to themselves, they have a natural tendency to start to rotate in a wrong direction, thus necessitating the use of starting means to set off the rotation of the rotor in the proper direction.

One of the objects of the present invention is to enable a rotor furnished with double-hinged blades, that is to say blades hinged for flapping and drag movements, to be automatically launched in the proper rotary direction, and another object of the invention is to automatically control the blade pitch so as to lessen or reverse the pitch on taking off and to bring said pitch back progressively to normal value as the rotary speed itself increases towards its normal value.

The invention is characterized by a device conveying to each hinged rotor blade, by rotation around its drag axis, a certain angular advance in its rotary plane in relation to the position it takes up when the wing has reached its normal rotary speed; this result, on taking off, in making the blade undergo a decrease of incidence helps to start off rotor hub.

In a preferred embodiment of the invention, the above mentioned device consists in a resilient connection such as a spring joining a suitable point of each blade to a suitable point of its hinging link.

The fixing point of the resilient connection to link may be made in the flapping axis, permitting the suppression, in normal flight, of the residual angular advance of the blade in relation to hub.

The new device can ensure proper starting of the rotors, initially folded, irrespective of the direction of the wind.

The appliances provided with the autogyro wing arrangements discussed above include the following features and their combinations:

The spindle of the self-rotating lifting wing may include fixing means such as lugs, permitting, for instance, the fixing of the spindle to devices of different shapes, nacelles, etc.;

A rigid fuselage integral with the wing spindle bears a suitable empennage at its free end, for example a foldable empennage, and provides thus for the stability of the appliance;

Rotor blades, folded one against the other during non-utilization of the autogyro, are held by a removable binding ring;

The whole of folded wing can be swung backwardly against the fuselage;

The hinging axis of the rotor to the fuselage is spaced from the hub axis of said rotor;

Raising of the rotor spindle in relation to the fuselage may be ensured by positive control;

Above mentioned raising may be ensured by a resilient system.

Other features and characteristics of the invention will appear as the description proceeds this description relating to a few examples of the invention given merely by way of illustration and shown diagrammatically in accompanying drawings in which.

Figure 6:
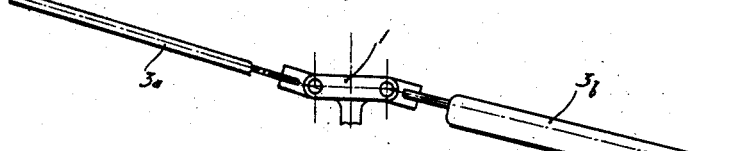
Figure 7:
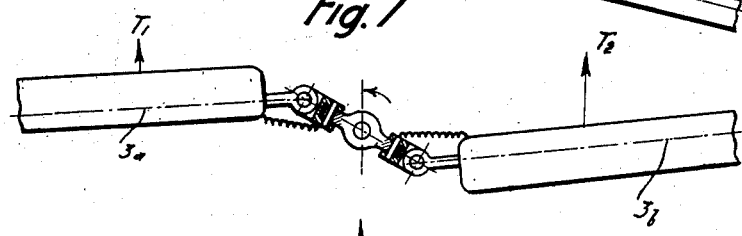

Figs. 6 and 7 respectively are a side view and a plan view of an improved rotor according to the invention and encountering a horizontal wind (speed of fall nil).

Figure 2:
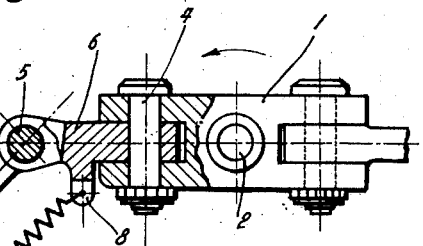
Fig. 2 is a top plan view of the structure of Fig. 1, with parts shown in section.
Figure 8:
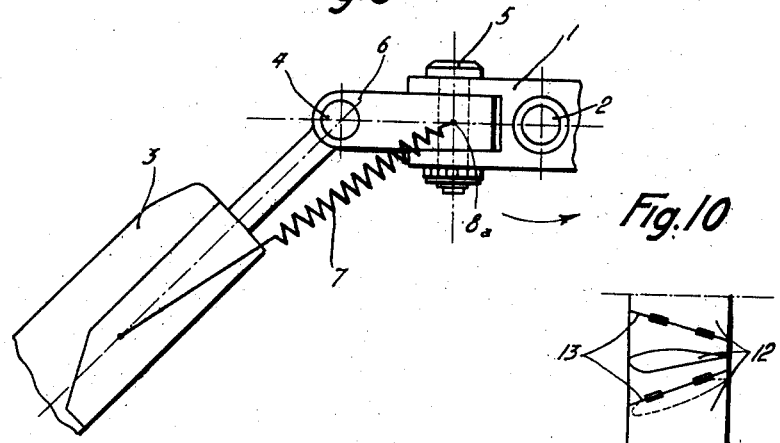

Fig. 8 is a view similar to Fig. 2 but showing a different embodiment of structure.

Figure 9:
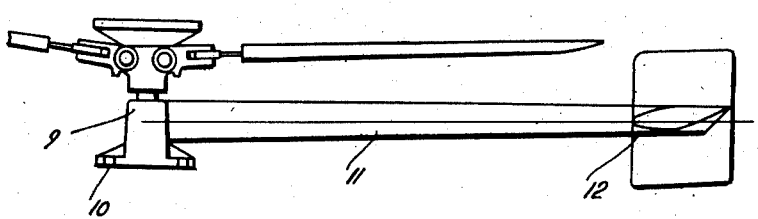

Fig. 9 is an elevational view of an appliance composed of a self-rotating wing according to the invention and a rigid fuselage integral with the wing spindle and bearing a foldable empennage.

Figure 10:
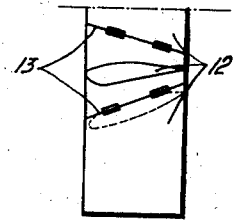

Fig. 10 is a fragmentary plan view of the foldable empennage.

Fig. 11 is a fragmentary elevational view of a rotor pivoting with respect to the fuselage of the appliance.

Fig. 12 shows a rotor folded against the fuselage.

Fig. 13 shows, in section, according to line XIII—XIII of Fig. 12, a binding-ring holding blades in closed position.

Fig. 14 is an elevational view of a jack-controlled pivoting rotor.

Fig. 15, is another view of the structure illustrated in Fig. 14, the rotor being closed and folded against the fuselage of the appliance which supports it.

Fig. 16 diagrammatically illustrates the operation of the structure shown in Fig. 2;

Fig. 17 diagrammatically illustrates the operation of the structure shown in Fig. 16, as viewed from the right hand side of the latter; and Fig. 18 diagrammatically illustrates two positions of the blade section corresponding to the operating positions illustrated in Figs. 16 and 17.

Figure 1:
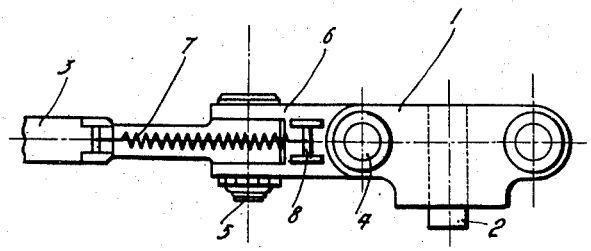
Fig. 1 is a side view of a base or foot of a blade hinged to the rotor hub and furnished with an angular advance device ensuring pitch variation.

The non-folding two-bladed rotor shown in Figs. 1 and 2 includes a hub 1, turning freely around the spindle (or pivot) 2. Each blade 3 is joined to hub 1 by a double hinge around the flapping axis 4 and the drag axis 5, these axes being in the form of pivot pins united by link 6, according to the classical arrangement adopted for most rotors.

According to the invention, blade 3 is connected, by a resilient system such as spring 7, to a point 8 of rotor, whose position, in relation to hub 1, is not affected by blade movements around its drag axis 5, the arrangement being made so that under the action of its spring 7, each rotor blade may take an angular advance $a$ which is only appreciable so long as the centrifugal force is small, that is to say, as long as the rotor has not reached an appreciable rotary speed.

Figure 3:
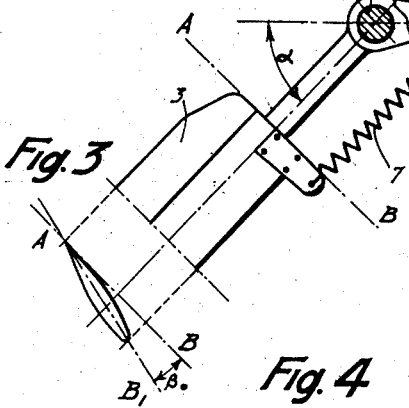
Fig. 3 is a view of a blade section.

Fig. 3, which represents a cross-section of the blade 3, shows the blade-tilt (angle of incidence) $\beta_0$ defined by the line AB (contained in a plane normal to the rotary axis of the hub 1 and containing the axis 4) and the line $AB_1$ (contained in the plane passing the leading and trailing edges of the blade).

Said angle $\beta_0$ is supposed to be slightly "cabré" or positive, as in the case in all blades of autogyros, but it may vary within large limits according to the method of self-rotation; it may even be negative in the case of rotating wings operating windmill fashion.

The working diagram of Fig. 16 illustrates the movement of the blade 3 of Fig. 2 through an angle of advance $a$ to the dotted line position 3' shown in Fig. 16. During this movement about the drag axis 5, the blade 3 also rises about flap axis 4 through the angle $\Delta 1$ so that a reference point $Za$ on blade 3 moves to $Zb$, as is shown in Fig. 17. The movement of the blades as illustrated in Figs. 16 and 17 shows that an increase of the flapping angle of a blade (around axis 4) causes a decrease (or even a reverse) of the angle of incidence $\beta_0$ (shown in Fig. 3). During the movement of the blade 3, as illustrated in Figs. 16 and 17, a blade section thereof moves from the position $3_1$ through the angle $\Delta 2$ to the position $3_2$, as is shown in Fig. 18.

In the above described example of the operation of a blade as illustrated in Figs. 16–18, where the distance between the flap and drag axes is $d_1$ and where the reference point $Za$ is located at a distance $x$ from the drag axis, the value of the angle $\Delta 2$ may be determined from the formula $$\Delta 2 = \Delta 1 \frac{d_1 + \cos \alpha}{X + \frac{d_1}{\cos \alpha} \cot g\, \alpha}$$

The diagrams of Figs. 16–18 show that when the blade comes into position 3', the variations $\Delta 2$ become nil.

Figures 4, 5:
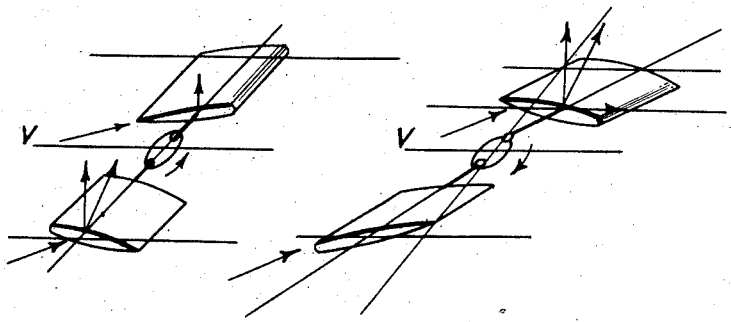
Fig. 4 is a diagrammatic perspective view of a usual rotor starting off in the wrong direction.
Fig. 5 is a view, corresponding to Fig. 4, of an improved rotor according to the invention and starting off in the proper direction.

In normal operation of a conventional self-rotating rotor, when the blades are at rest, the wind V engaging the blades from underneath the same (see Fig. 4) causes, as is confirmed by experience, the rotor to start in the wrong direction with reference to rotation at normal speed. When rotation of the rotor is to commenced, there must be recourse either to an outside source of energy, or else to a reverse pitch, such a reverse pitch necessitating an additional hinging in the blade mountings and a pitch controlling device requiring more or less complicated mechanical structures.

The invention permits the elimination of this drawback owing to the fact that at the start (see Fig. 5), the blades, which are in their maximum position of angular advance ($a$ in Fig. 2) are raised, by pivoting about the flapping axis, as a result of falling speed and rapidly reverse their pitch, thus ensuring the starting of the rotor in the correct rotary direction, after which the pitch returns gradually to its normal value.

Even if there is no speed drop, the starting of the rotor takes place in the correct direction.

As will be seen from Figs. 6 and 7, blade $3a$, the leading edge of which is engaged by wind V, rises under the effect of said wind and, thus, its incidence decreases (as well as its drag $T_1$), whilst blade $3b$, the trailing edge of which is engaged by wind V, is tilted downwardly, increasing the angle of pitch. Encountering a big negative incidence, said blade $3b$ produces in the wind a drag $T_2$ which increases. Blade $3b$ is then driven in the direction of the wind with a force $T_2$ which, being higher than $T_1$, causes a torque ensuring rotation in the correct direction. When the rotary speed increases, the flapping up decreases (under the action of centrifugal force), and the blades return gradually to their normal pitch.

According to the force of the tension of spring 7, there may exist a residual angular advance in normal operation of the rotor. To suppress it, the spring 7 may be connected to a point $8a$ placed in the axis of link 6 (see Fig. 8).

The improved wing which has just been described, may be combined with an appliance of the kind shown on Fig. 9 wherein the wing spindle 9 includes attachment lugs 10 for the fixing of containers, nacelles and other devices or objects intended to be dropped.

The spindle 9 may be connected by means of a rigid fuselage 11 to an empennage 12 having members which are foldable around oblique axes 13 (Fig. 10). The empennage contrivance gives a certain stability to the whole appliance.

The rotor being double-bladed, and the empennage foldable, the apparatus with self-rotating wing thus composed requires a very small space when not in use.

In the embodiment of the apparatus shown in Figs. 11 to 13, the spindle $9a$ of a three-bladed folding rotor, is mounted on the fuselage 14 through the medium of hinging joint 15 having an axis spaced from and perpendicular to the spindle axis $9a$.

The hinged joint 15 permits swinging the whole of the folded rotor backwardly, against the fuselage 14. In folded position, the rotor blades are held one against the other by means of a removable binding ring 16 which may be joined to any part of the fuselage and released (for example by shearing) at the moment of dropping the appliance, after the starting of a device for rocking up of the rotor in relation to the fuselage. Springs 7, being taut, cause the rotation of the blades around their drag axes.

The whole of the system encounters the wind, and the blades which show a negative incidence have an inclination to drop. Their stalling, in relation to the normal plane of the rotary axis, becomes such that the rotation of the rotor starts off in the correct direction whilst the thrusts, raising on the rotor, aid the pivoting of the spindle $9a$, owing to the offsetting of the hinging 15.

In a variation of the invention illustrated in

Figs. 14 and 15, the raising of the rotor, initially swung backwardly in closed position, is ensured by jack 17. The blades, folded axially, are jointed to a shaft 18, concentric to the hub, by an attaching device 19 which releases said blades when the hub has arrived in working position.

The embodiments of the invention described above and shown on accompanying drawing have merely been given by way of example.

What I claim is:

1. In an autogyro rotor, a wing arrangement comprising, in combination, a pair of elongated pivot pins which are spaced from and parallel to each other and which have their longitudinal axes located in a single plane; hub means mounted on one of said pivot pins for rotation about the longitudinal axis thereof; blade means mounted adjacent one end thereof on the other of said pair of pivot pins for rotation about the axis thereof; a third elongated pivot pin located between said pair of pivot pins and having its longitudinal axis perpendicular to said plane in which the longitudinal axes of said pair of pivot pins are located, said third pivot pin being fixedly mounted on said hub means; link means mounted adjacent one end thereof on said third pivot pin for rotation about the axis thereof and being connected adjacent the other end thereof to the other of said pair of pivot pins so as to connect the latter to said third pivot pin, whereby the longitudinal axis of said third pivot pin may form a flapping axis of said blade means and the longitudinal axis of said other pivot pin may form a drag axis for said blade means; and resilient means interconnecting said blade means and link means for urging said blade means about said other pivot pin to a position in advance of its normal rotating position, said resilient means having a force which is substantially less than the centrifugal force acting on said blade means during normal rotation thereof so that said resilient means only acts on said blade when the latter is stationary or rotating slowly, whereby, when said blade moves about said other pivot pin between said advanced position and said normal operating position and about said third pivot pin during movement between said two positions, the pitch of said blade automatically changes.

2. In an autogyro rotor, a wing arrangement comprising, in combination, a pair of elongated pivot pins which are spaced from and parallel to each other and which have their longitudinal axes located in a single plane; hub means mounted on one of said pivot pins for rotation about the longitudinal axis thereof; blade means mounted adjacent one end thereof on the other of said pair of pivot pins for rotation about the axis thereof; a third elongated pivot pin located between said pair of pivot pins and having its longitudinal axis perpendicular to said plane in which the longitudinal axes of said pair of pivot pins are located, said third pivot pin being fixedly mounted on said hub means; link means mounted adjacent one end thereof on said third pivot pin for rotation about the axis thereof and being connected adjacent the other end thereof to the other of said pair of pivot pins so as to connect the latter to said third pivot pin, whereby the longitudinal axis of said third pivot pin may form a flapping axis of said blade means and the longitudinal axis of said other pivot pin may form a drag axis for said blade means; an elongated coil spring fixedly connected at one end thereof to said blade and at the other end thereof to said link means for urging said blade means about said other pivot pin to a position in advance of its normal rotating position, said coil spring having a force which is substantially less than the centrifugal force acting on said blade during normal rotation thereof so that said coil spring only acts on said blade when the latter is stationary or rotating slowly, whereby, when said blade moves about said other pivot pin between said advanced position and said normal operating position and about said third pivot pin during movement between said two positions, the pitch of said blade automatically changes.

3. In an autogyro rotor, a wing arrangement comprising, in combination, a pair of elongated pivot pins which are spaced from and parallel to each other and which have their longitudinal axes located in a single plane; hub means mounted on one of said pivot pins for rotation about the longitudinal axis thereof; blade means mounted adjacent one end thereof on the other of said pair of pivot pins for rotation about the axis thereof; a third elongated pivot pin located between said pair of pivot pins and having its longitudinal axis perpendicular to said plane in which the longitudinal axes of said pair of pivot pins are located, said third pivot pin being fixedly mounted on said hub means; link means mounted adjacent one end thereof on said third pivot pin for rotation about the axis thereof and being connected adjacent the other end thereof to the other of said pair of pivot pins so as to connect the latter to said third pivot pin, whereby the longitudinal axis of said third pivot pin may form a flapping axis of said blade means and the longitudinal axis of said other pivot pin may form a drag axis for said blade means; and an elongated coil spring fixedly connected at one end thereof to said blade adjacent the leading edge of the latter and at the other end thereof to said link means at a position other than the side of said single plane which is distant from said leading edge of said blade means so that said coil spring urges said blade means about said other pivot pin to a position in advance of its normal rotating position, said coil spring having a force which is substantially less than the centrifugal force acting on said blade during normal rotation thereof so that said coil spring only acts on said blade when the latter is stationary or rotating slowly, whereby, when said blade moves about said other pivot pin between said advanced position and said normal operating position and about said third pivot pin during movement between said two positions, the pitch of said blade automatically changes.

4. In an autogyro rotor, a wing arrangement comprising, in combination, a pair of elongated pivot pins which are spaced from and parallel to each other and which have their longitudinal axes located in a single plane; hub means mounted on one of said pivot pins for rotation about the longitudinal axis thereof; blade means mounted adjacent one end thereof on the other of said pair of pivot pins for rotation about the axis thereof; a third elongated pivot pin located between said pair of pivot pins and having its longitudinal axis perpendicular to said plane in which the longitudinal axes of said pair of pivot pins are located, said third pivot pin being fixedly mounted on said hub means; link means mounted adjacent one end thereof on said third pivot pin for rotation about the axis thereof and being connected adjacent the other end thereof to the other of said pair of pivot pins so as to connect the latter to said third pivot pin, whereby the longitudinal axis of said third pivot pin may form a flapping axis of said blade means and the longitudinal axis of said other pivot pin may form a drag axis for said blade means; and an elongated coil spring fixedly connected at one end thereof to said blade and at the other end thereof to said link means at a point between said third pivot pin and said other pivot pin for urging said blade about said other pivot pin to a position in advance of its normal rotating position, said coil spring having a force which is substantially less than the centrifugal force acting on said blade during normal rotation thereof so that said coil spring only acts on said blade when the latter is stationary or rotating slowly, whereby when said blade moves about said other pivot pin between said advanced position and said normal operating position and about said third pivot pin during movement between said two positions, the pitch of said blade automatically changes.

5. In an autogyro rotor, a wing arrangement comprising, in combination, a pair of elongated pivot pins which are spaced from and parallel to each other and which have their longitudinal axes located in a single plane; hub means mounted on one of said pivot pins for rotation about the longitudinal axis thereof; blade means mounted adjacent one end thereof on the other of said pair of pivot pins for rotation about the axis thereof; a third elongated pivot pin located between said pair of pivot pins and having its longitudinal axis perpendicular to said plane in which the longitudinal axes of said pair of pivot pins are located, said third pivot pin being fixedly mounted on said hub means; link means mounted adjacent one end thereof on said third pivot pin for rotation about the axis thereof and being connected adjacent the other end thereof to the other of said pair of pivot pins so as to connect the latter to said third pivot pin, whereby the longitudinal axis of said third pivot pin may form a flapping axis of said blade means and the longitudinal axis of said other pivot pin may form a drag axis for said blade member; and elongated resilient means connected at one end thereof to said link means at a point in said single plane and at the other end thereof to said blade at a point in a plane including the longitudinal axis of said other pivot pin and the neutral longitudinal axis of said blade, said resilient means urging said blade about said other pivot pin to a position in advance of its normal rotating position and said resilient means having a force which is substantially less than the centrifugal force acting on said blade means during normal rotation thereof so that said resilient means only acts on said blade when the latter is stationary or rotating slowly, whereby, when said blade moves about said other pivot pin between said advanced position and said normal operating position and about said third pivot pin during movement between said two positions, the pitch of said blade automatically changes.

6. In an autogyro rotor adapted to be attached to an object in order to retard the speed of descent of the same, a wing arrangement, comprising in combination, hub means; central pivot means having a central pivot axis, being operatively connected to and supporting said hub means for rotation about said central pivot axis; elongated link means having a pair of opposite end portions; flapping pivot means interconnecting one of said end portions of said link means and said hub means and supporting said link means for turning movement about a flapping axis extending normal to a plane including said central pivot axis; blade means; drag pivot means interconnecting the other of said end portions of said link means and said blade means and supporting said blade means for turning movement about a drag axis parallel to and spaced from said central pivot axis, said drag axis being perpendicular to said flapping axis; and resilient means interconnecting said blade means and said link means for urging said blade means to turn about said drag axis to a position in advance of normal rotating position, said resilient means having a force which is substantially less than the centrifugal force acting on said blade means during normal rotation thereof so that said resilient means only acts on said blade means when the latter is stationary or rotating slowly, whereby, when said blade means moves about said drag axis between said advance position and said normal operating position and about said flapping axis during movement between said two positions, the pitch of said blade automatically changes.

7. In an autogyro rotor to be attached to an object for retarding the descent of the same, a wing arrangement, comprising in combination, hub means mounted for rotation about a central pivot axis; elongated link means having a pair of opposite end portions and being mounted at one of its end portions on said hub means for turning movement about a flapping axis normal to and spaced from said central pivot axis; blade means mounted on the other of said end portions of said link means for turning movement about a drag axis normal to and spaced from said flapping axis, said drag axis being parallel to and spaced from said central pivot axis; and resilient means interconnecting said blade means and link means for urging said blade means about said drag axis to a position in advance of its normal rotating position, said resilient means having a force which is substantially less than the centrifugal force acting on said blade means during normal rotation thereof so that said resilient means only acts on said blade means when the latter is stationary or rotating slowly, whereby, when said blade means moves about said drag axis between said advance position and said normal operating position and about said flapping axis during movement between said two positions, the pitch of said blade automatically changes.

RENÉ DORAND.

REFERENCES CITED

The following references are of record in the file of this patent:

UNITED STATES PATENTS

| Number | Name | Date |
|---|---|---|
| 1,673,233 | Cierva | June 12, 1928 |
| 1,986,709 | Breguet | Jan. 1, 1935 |
| 1,995,460 | Pecker | Mar. 26, 1935 |
| 2,052,086 | Dornier | Aug. 25, 1936 |
| 2,102,027 | Prewitt | Dec. 14, 1937 |
| 2,115,754 | Vaughn | May 3, 1938 |
| 2,121,345 | Hafner | June 21, 1938 |
| 2,365,357 | Prewitt | Dec. 19, 1944 |
| 2,440,294 | Campbell | Apr. 27, 1948 |

FOREIGN PATENTS

| Number | Country | Date |
|---|---|---|
| 232,343 | Great Britain | Apr. 21, 1925 |
| 437,521 | Great Britain | Oct. 28, 1935 |